UNITED STATES PATENT OFFICE.

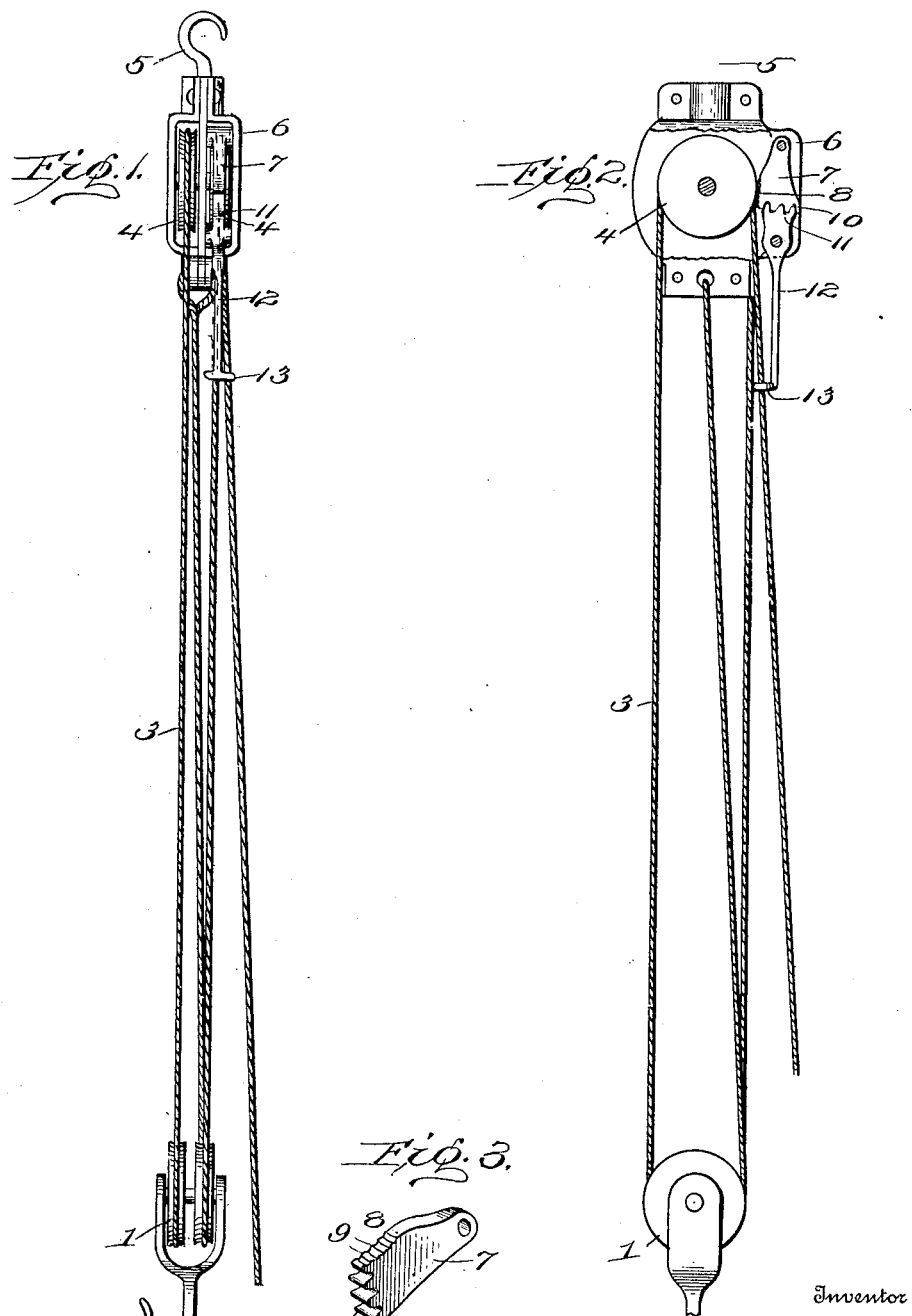

CHARLES GABEL, OF HAWKEYE, IOWA.

PULLEY.

No. 892,244.  Specification of Letters Patent.  Patented June 30, 1908.

Application filed January 3, 1908. Serial No. 409,221.

*To all whom it may concern:*

Be it known that I, CHARLES GABEL, a citizen of the United States, residing at Hawkeye, in the county of Fayette and State of Iowa, have invented certain new and useful Improvements in Pulleys, of which the following is a specification.

This invention relates to pulleys, and more particularly to a pulley having automatic means for clamping and securing the rope upon the pulley after the same has been drawn taut.

The object of my invention is to provide a double pulley with a clutch mechanism so formed as to be operated by the rope, and to clamp said rope upon the pulley when it is desired to prevent the same from becoming slack.

In the drawings, I have illustrated my invention as applied to a wire stretching mechanism, however, I wish it to be understood that this is only one of the many uses to which my invention may be applied.

With the above objects in view, and such others as may hereinafter appear, my invention consists in the particular construction of the various parts, and in the novel manner of combination and arrangement of said parts, all of which will be more fully described and specifically pointed out in the appended claims.

In the drawings forming a part of this specification: Figure 1, is a view in side elevation, illustrating two double pulleys, and their rope connection, one of which is provided with my improved clutch mechanism, Fig. 2, is a sectional view of a pulley illustrating my invention, and Fig. 3, is a detail view of the cam illustrating the construction of its face.

Referring by numerals to the drawings, 1 represents an ordinary double pulley to which is attached a wire clamp 2. This pulley is connected by a rope 3, to a pulley 4, provided with an anchor hook 5, or any other form of hook that may be found desirable. The casing or housing 6, of the pulley 4, incloses a cam 7, journaled therein in juxtaposition to one of the pulleys. This cam is provided with a concaved face 8, provided with lateral notches 9, adapted to engage and clamp the rope 3, between itself and the said pulley. This cam is further provided with a ratchet 10, which are in engagement with the ratchets 11, upon one end of an arm 12, also pivoted within the casing, and being provided upon its other end with a loop 13, adapted to receive the free end of the rope.

It will be seen that upon exerting a direct pull upon the free end of the rope, the same will run freely over the pulleys, and that when said rope is pulled at an angle from the pulleys, the cam will be caused to clamp the same between itself and the face of the pulley, and thereby retain the rope and thus the wire in a taut position.

I do not limit myself to the exact construction illustrated and described, since various minor changes may be resorted to without sacrificing any of the principles or advantages of this invention. It is also to be understood that the pulley and cam and means for operating the same, may be used for various purposes, other than upon wire stretchers, all of which is within the scope of my invention.

Having thus described the various features of my invention, what I claim as new and desire to secure by Letters Patent, is:

1. In a pulley, the combination with the rope running therein, a cam journaled in juxtaposition to said pulley, ratchets carried by the said cam, a pivoted arm, ratchets upon one end of the arm in engagement with the ratchets upon the cam, a loop in the other end of the arm which receives the free end of the rope, substantially as specified.

2. In a pulley having the usual rope adapted to travel therein, a cam journaled in juxtaposition to the pulley, the face of the cam being concaved and provided with lateral notches, ratchets carried by the cam, an arm pivoted adjacent to the cam, ratchets upon one end of the arm in engagement with the ratchets upon the cam, a loop in the other end of the arm, the free end of the rope passing through said loop, substantially as specified.

CHARLES GABEL.

Witnesses:
M. V. HENDERSON, Jr.,
PAULINE L. GABEL.